US012510101B2

(12) United States Patent
Botkin et al.

(10) Patent No.: US 12,510,101 B2
(45) Date of Patent: *Dec. 30, 2025

(54) CEILING FAN WITH CANOPY MOUNTING ASSEMBLY

(71) Applicant: Hunter Fan Company, Memphis, TN (US)

(72) Inventors: Charles William Botkin, Cordova, TN (US); Rickey Thomas Jones, Memphis, TN (US); Douglas Troy Mason, Horn Lake, MS (US)

(73) Assignee: Hunter Fan Company, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/989,792

(22) Filed: Dec. 20, 2024

(65) Prior Publication Data

US 2025/0122890 A1 Apr. 17, 2025

Related U.S. Application Data

(63) Continuation of application No. 18/370,044, filed on Sep. 19, 2023, now Pat. No. 12,253,099.

(51) Int. Cl.

| | |
|---|---|
| ***F04D 29/64*** | (2006.01) |
| ***F04D 25/06*** | (2006.01) |
| ***F04D 25/08*** | (2006.01) |
| ***F21V 33/00*** | (2006.01) |

(52) U.S. Cl.
CPC .......... *F04D 29/646* (2013.01); *F04D 25/06* (2013.01); *F04D 25/088* (2013.01); *F21V 33/0096* (2013.01)

(58) Field of Classification Search
CPC . F04D 25/088; F21V 33/0096; F16M 13/027; F16B 9/052
USPC .............. 403/328; 362/404, 408; 416/244 R
See application file for complete search history.

(56) References Cited

U.S. PATENT DOCUMENTS

| | | | |
|---|---|---|---|
| 3,832,075 | A | 8/1974 | Arai |
| 6,171,061 | B1 | 1/2001 | Hsu |
| 7,168,670 | B2 | 1/2007 | Liang |
| 7,261,520 | B2 | 8/2007 | Wang |
| 9,097,266 | B2 | 8/2015 | Lin |
| 9,605,687 | B1 | 3/2017 | Zauhar et al. |
| 2008/0224013 | A1 | 9/2008 | Huang |
| 2020/0400162 | A1 | 12/2020 | He et al. |
| 2021/0231129 | A1 | 7/2021 | Mason et al. |
| 2023/0025995 | A1 | 1/2023 | Botkin et al. |

FOREIGN PATENT DOCUMENTS

| | | | |
|---|---|---|---|
| CN | 202065947 | U | 12/2011 |
| DK | 101247 | C | 3/1965 |

*Primary Examiner* — Kenneth J Hansen
(74) *Attorney, Agent, or Firm* — McGarry Bair PC; Mark A. Davis

(57) ABSTRACT

A ceiling fan assembly can include a motor for rotating one or more blades to drive a volume of air about a space. The ceiling fan assembly can include a ceiling fan mount with a canopy. The canopy can be received by a mounting bracket to enclose the mounting hardware near the ceiling.

20 Claims, 6 Drawing Sheets

30

CEILING FAN WITH CANOPY MOUNTING ASSEMBLY

CROSS-REFERENCE TO RELATED APPLICATION(S)

This application is a continuation of U.S. patent application Ser. No. 18/370,044, filed on Sep. 19, 2023, now allowed, which is hereby incorporated herein by reference in its entirety.

BACKGROUND

Ceiling fans are typically suspended from a structure, such as a ceiling or wall, for moving a volume of air about a space. The ceiling fan typically includes a motor, with a rotor and stator, downrod, canopy and blades, all secured to the structure by a mounting assembly that includes fasteners and brackets. The structure to which the ceiling fan is mounted is typically a ceiling where a canopy decoratively covers the mounting assembly.

BRIEF DESCRIPTION

In one aspect, the disclosure relates a ceiling fan assembly mountable to a surface, such as a ceiling, the ceiling fan assembly comprising: a ceiling fan; a surface bracket mountable to the surface and defining an outer periphery and having at least one snap spring with spaced locating feet, which project laterally from the outer periphery; a downrod coupling the ceiling fan and the surface bracket; and a canopy having an opening through which the downrod passes and a set of pockets receiving the locating feet.

DETAILED DESCRIPTION

Figure 1:
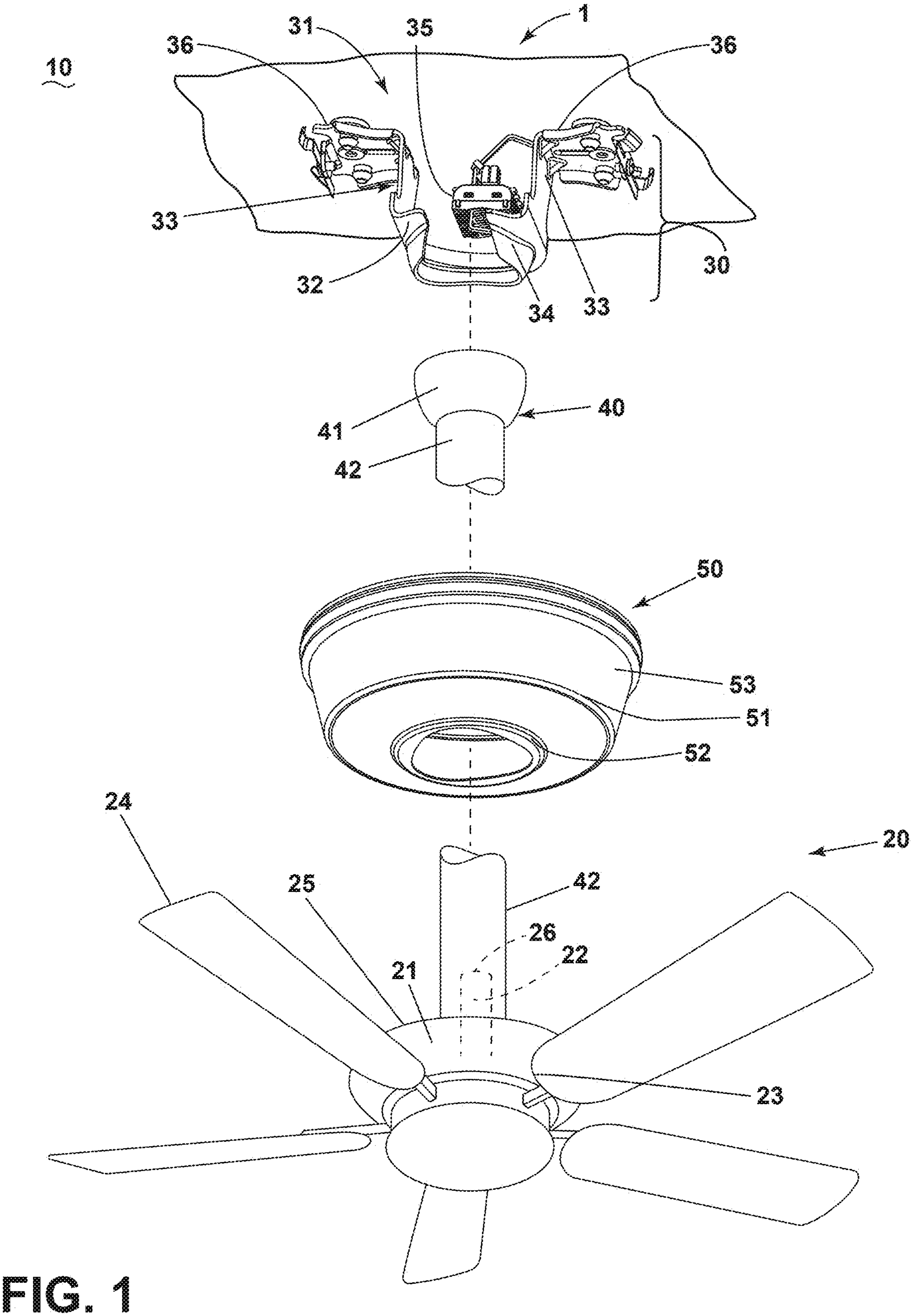
FIG. 1 is a bottom, perspective, partially exploded view of a ceiling fan assembly with a fan, downrod, surface bracket, and canopy.

The disclosure is related to a ceiling fan mounting system, which can be used, for example, in residential, agricultural, industrial, and commercial applications. More specifically, this disclosure relates to a ceiling fan mounting system utilizing a snap-on canopy mounting system. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a ceiling fan assembly 10 comprises a ceiling fan 20, surface bracket 30, downrod 40, and canopy 50. The ceiling fan 20 is secured to a surface 1, such as a ceiling or wall, by the downrod 40 and the surface bracket 30. The surface bracket 30 is secured to the surface 1 in any desirable manner and the downrod 40 couples the ceiling fan 20 to the surface bracket 30. The canopy 50 covers the surface bracket 30 and at least a portion of the interface of the surface bracket 30 and downrod 40. The canopy 50 can function as one or both of an aesthetic covering for the mechanical and electrical connections for the surface bracket 30 and the surface 1.

The ceiling fan 20 can comprise a motor 21 having a stationary motor shaft 22, a rotor 23, and a stator 25. The motor shaft 22 can be secured to or integrated with the stator 25. The rotor 23 is rotationally coupled to the motor shaft 22 by a bearing assembly (not shown) supported on the motor shaft 22. The ceiling fan 20 further includes a plurality of blades 24, which are directly coupled to the rotor 23 or indirectly coupled through a bracket, commonly referred to as a blade iron. The ceiling fan can still further include a motor adapter 26 that couples the motor shaft 22 to the downrod 40.

The downrod 40 comprises a ball 41 affixed to one end of a tube 42. The tube 42 can be of a fixed or adjustable length, such as a telescoping tube. The end of the tube 42 opposite the ball 41 is secured to the motor shaft 22 and/or the motor adapter 26.

Figure 2:
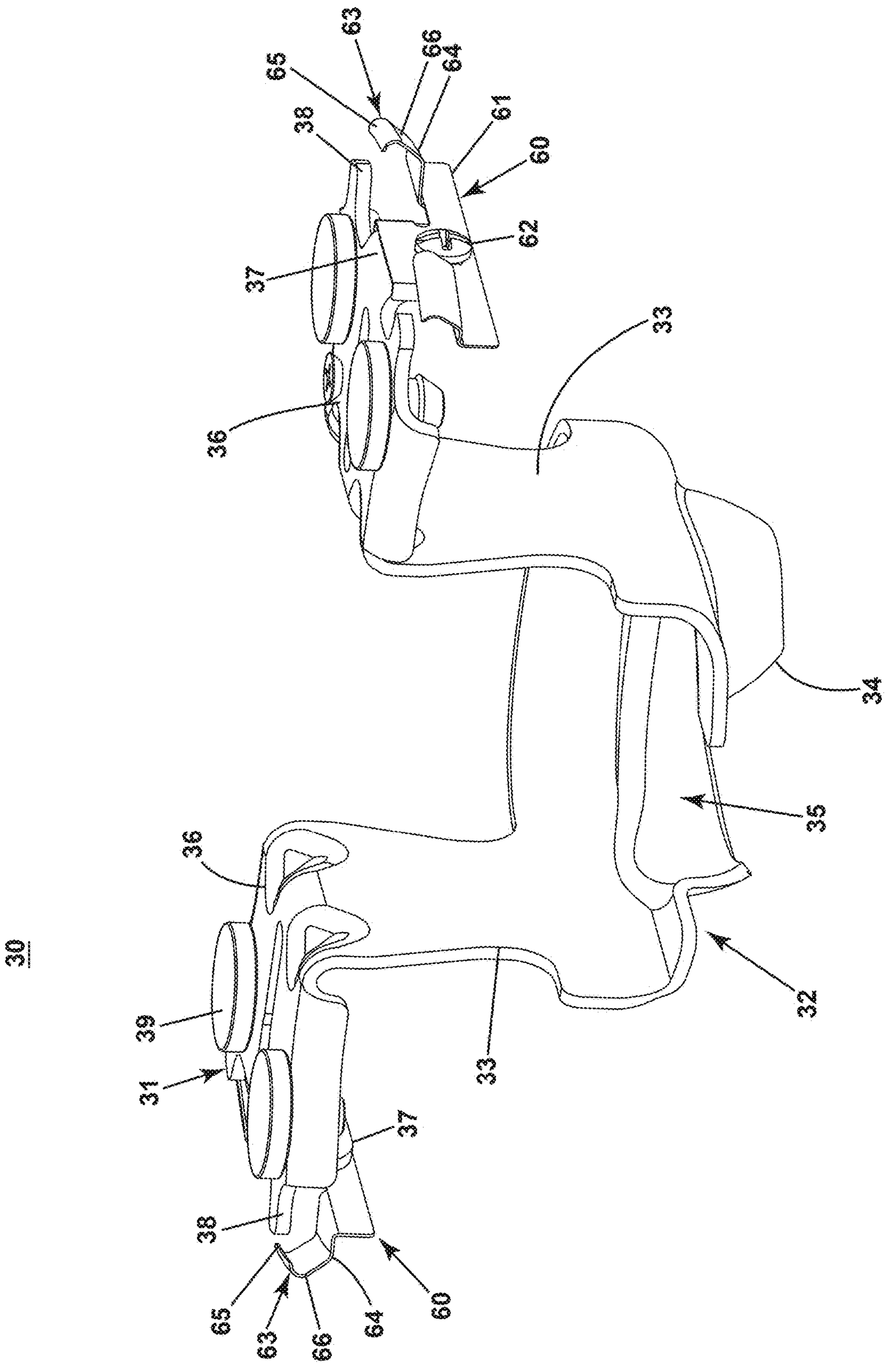
FIG. 2 is a perspective view of the surface bracket of FIG. 1

Referring to FIG. 2, the surface bracket 30 has surface plate 31 from which is suspended a ball seat 32 by spaced arms 33 extending between the surface plate 31 and the ball seat 32. The ball seat includes an open collar 34, defining an opening 35, which is oriented with the spaced arms 33 to define an inlet through which the tube 42 and ball 41 can pass.

The surface plate 31 has a plurality of openings for receiving fasteners, such as screws or bolts, to secure the surface plate 31 to the structure 1 or an electrical fixture, such as a junction box, with the structure 1. The surface plate 31 is illustrated as wings 36 extending from the arms 33 but could be a continuous plate, which may or may not be flat. The flange 37 is illustrated as multiple discrete flanges 37, but it could be a continuous flange 37.

Each of the wings 36 has a flange 37 located between a pair of position tabs 38. The flange 37 extends away from the wings 36 while the position tabs 38 extend laterally away from the wings 36. While the wings 36 are illustrated as two, diametrically opposed wings 36, there could be more than two spaced about the periphery of the surface bracket 30.

Resilient bushings 39 can be affixed to the wings 36 and are sized to bear against the structure 1 when the surface bracket 30 is secured to the structure 1. The bushings 39 function to stabilize the surface bracket against the surface and can conform to the structure 1.

A set of snap springs 60 are mounted to the flanges 37. It is contemplated there will be one snap spring 60 for each flange 37 but it is possible to mount more than one snap spring 60 to each flange 37. The snap spring 60 comprises a base 61, which is secured to the flange 37, by a suitable fastener, such as a screw or bolt 62 passing through the base 61 and into a tapped opening in the flange 37, which increases the ease of assembly.

One or more locating feet 63 extend from the base 61. The locating feet include a first segment 64, second segment 65, and a reverse turn 66. The first segment 64 extends away from the flange 37 while the second segment 65 extends toward the flange 37 because of the reverse turn 66. While the first and second segments 64, 65 are shown extending upwardly, in addition to either toward or away from the base, the snap spring 60 could be designed such that the first and second segments 64, 65 extend downwardly.

It is contemplated that the snap spring 60 will be formed from a single piece of resilient material, such as a thin plate of metal, like spring steel, which is cut and then bent into the configuration as seen in the drawings. However, it is possible form the snap spring 60 in other ways, such as injection molding from plastic, or 3-D printing from plastic or metal.

While the surface plate 31 is shown in a two-wing configuration, it is contemplated the that the surface plate 31 could be a continuous structure, such as, for example, a disk or plate. In a disk or plate configuration, the flange 37 could be continuous about the periphery of the disk or plate, with the snap springs 60 mounted at different peripheral locations along the flange 37. The shape of the disk or plate could be circular or some other desired shape. The disk or plate need not be flat.

Figure 3:
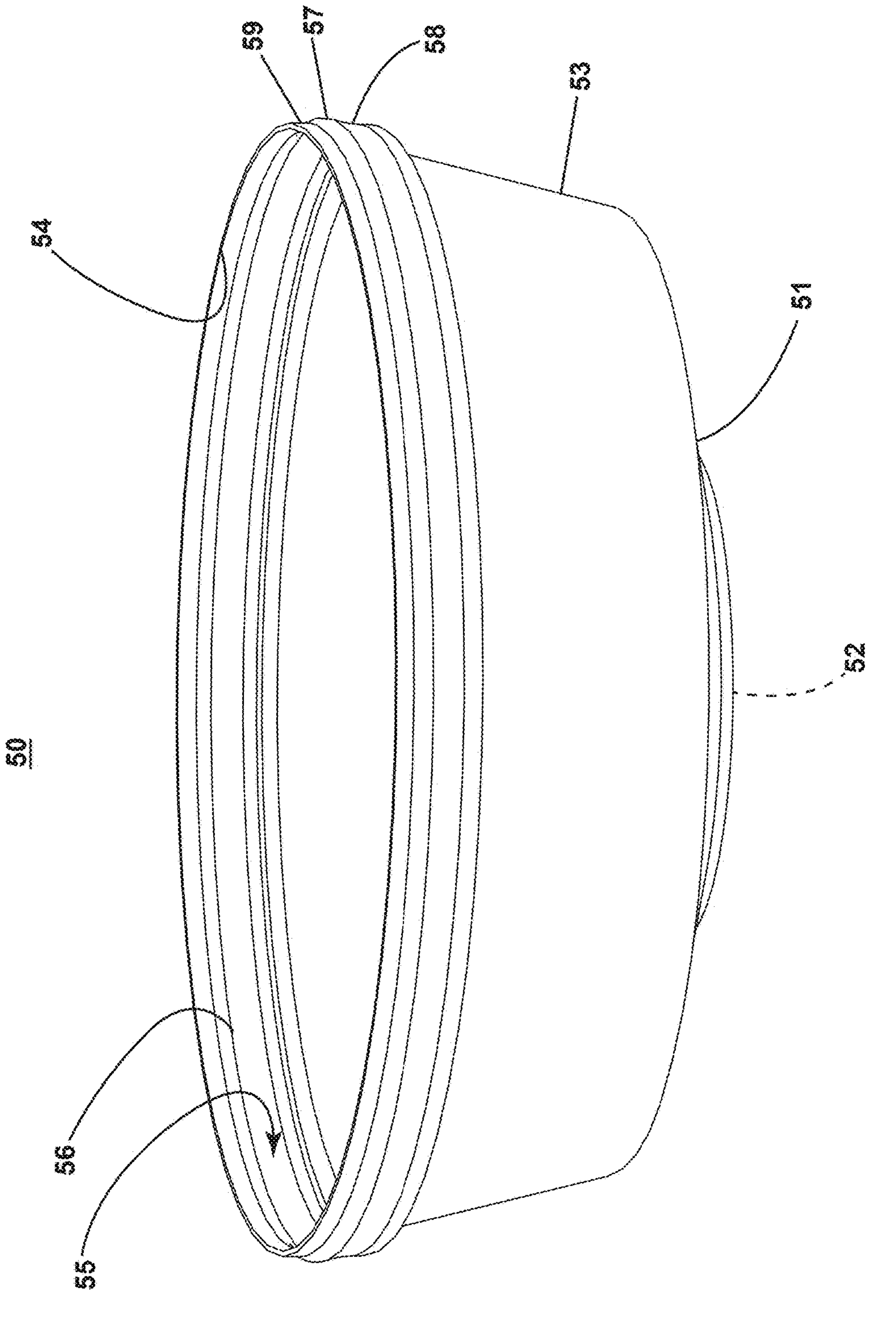
FIG. 3 is a perspective view of the canopy of FIG. 1

FIG. 3 is a perspective view of the canopy 50, which has a bottom wall 51, with an opening 52 for receiving the downrod 40, a peripheral wall 53 extending upwardly from the bottom wall 51. The peripheral wall 53 terminates in an open top 54. A pocket 55 is provided in the peripheral wall 53. The pocket 55 is sized to receive the snap springs 60. The pocket 55 can be a recess 56 in the peripheral wall 53. The recess 56 can be formed as rib 57 in the peripheral wall 53, with the inner surface of the rib 57 forming a channel that defines the recess 56. The channel has a concave cross section when seen from the interior of the canopy 50. The recess 56 includes an upper shoulder 59 and a lower shoulder 58. The recess 56 and corresponding channel is illustrated as a continuous recess about the peripheral wall. However, the recess 56 could be discrete recesses that are located according to the snap springs 60. The diameter of the canopy peripheral wall 53 is greater below the recess 56 than above the recess 56.

Figure 4:
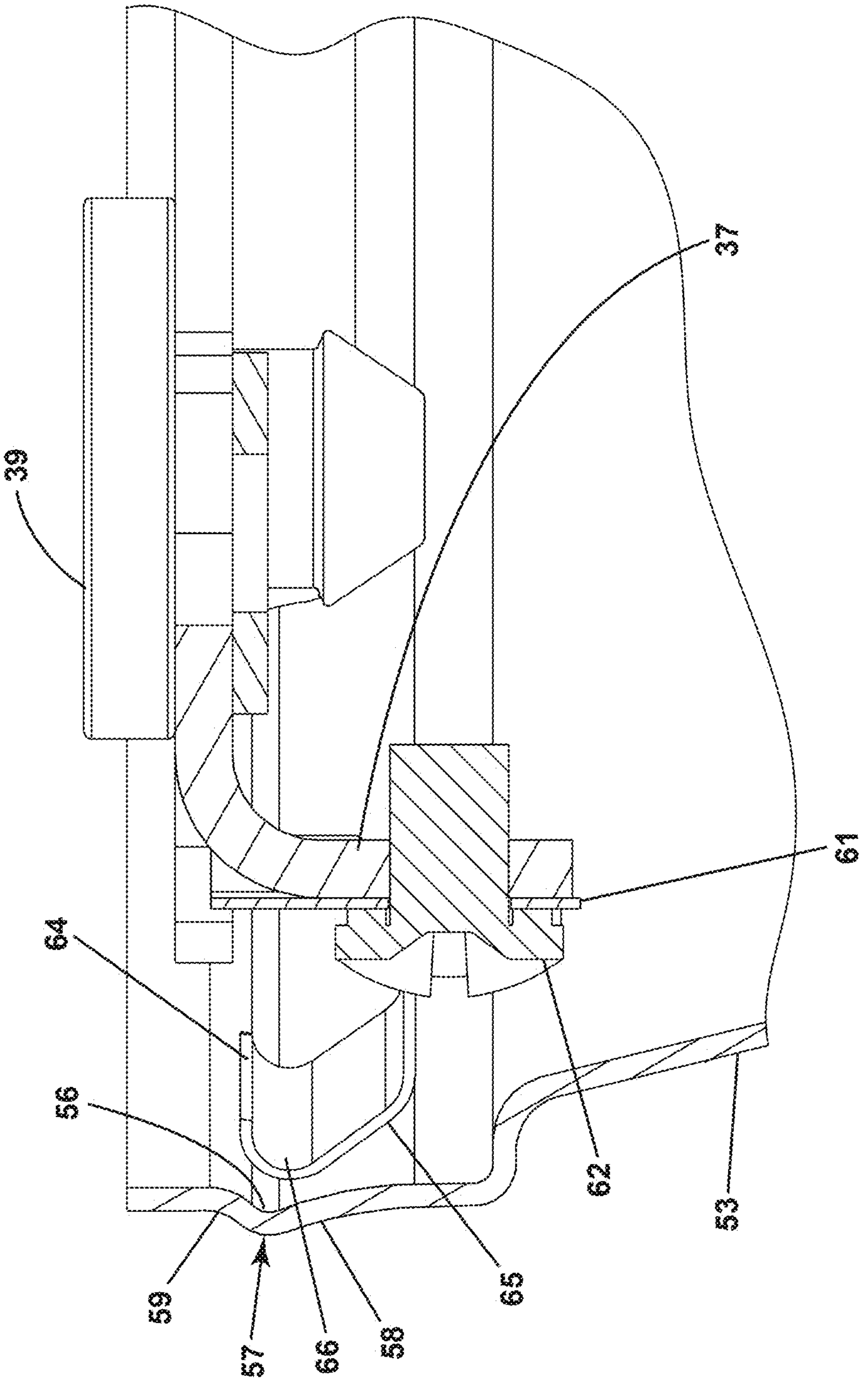
FIG. 4 is a partial section view showing the canopy secured to the surface bracket with a snap spring.

FIG. 4 shows the relationship of the snap spring 60 to the pocket 55 when the canopy 50 is affixed to the surface bracket 30. As is seen, the reverse turn 66 is received within the pocket 55, with the reverse turn 66 and/or the second segment 65 bearing against the upper shoulder 59.

The recess 56 and snap spring 60 have similar or complementary cross-sectional shapes as seen in FIG. 4. The first segment 64 is longer than the second segment 65, which is similar to the shapes of the lower shoulder 58 and upper shoulder 59. Similarly, the first segment 64 is longer and at a steeper angle than the second segment 65 as is the lower shoulder 58 to the upper shoulder 59.

Figure 5:
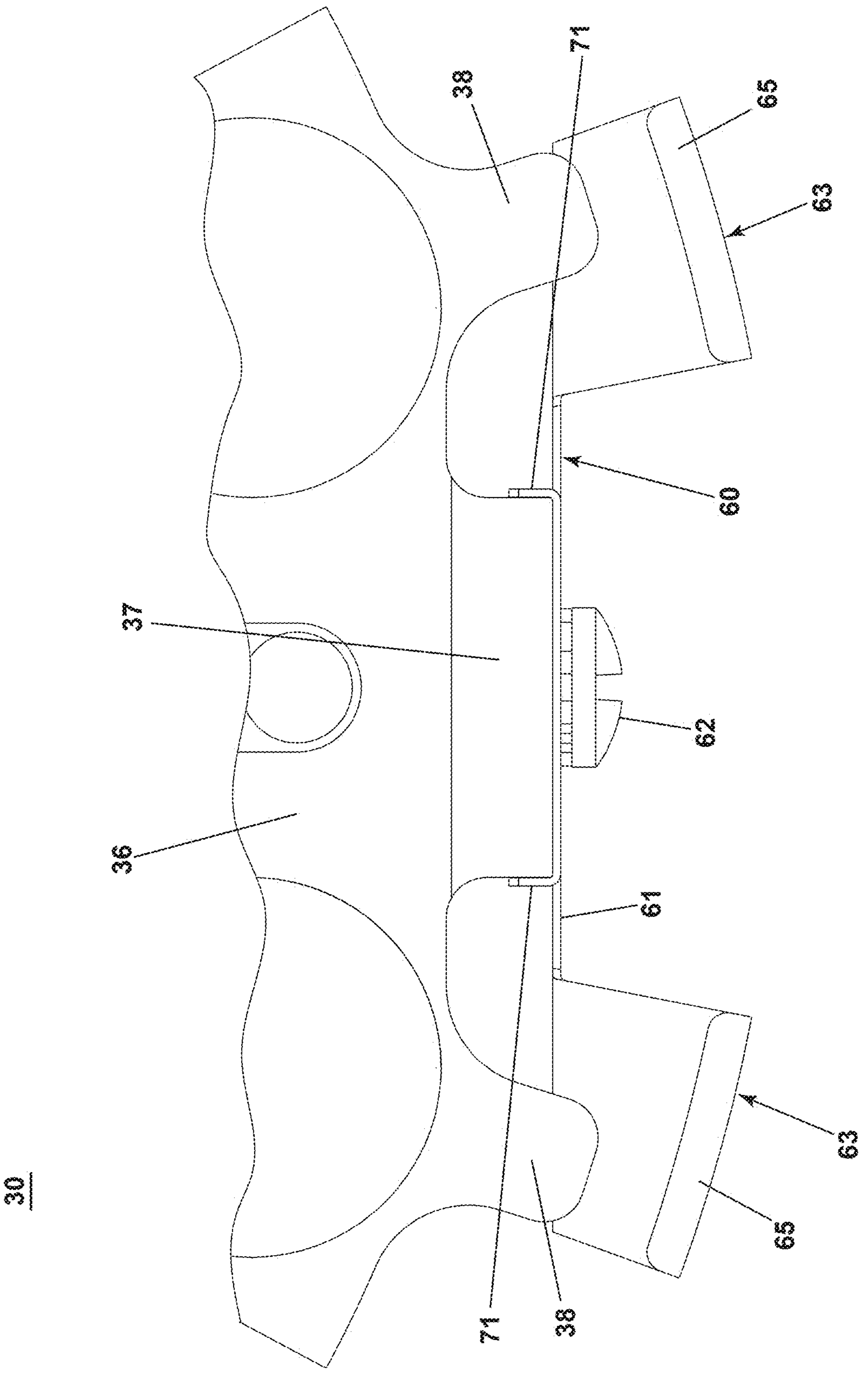
FIG. 5 is a top view of a portion of FIG. 4 and illustrate the interface between the snap spring and the surface bracket.
Figure 6:
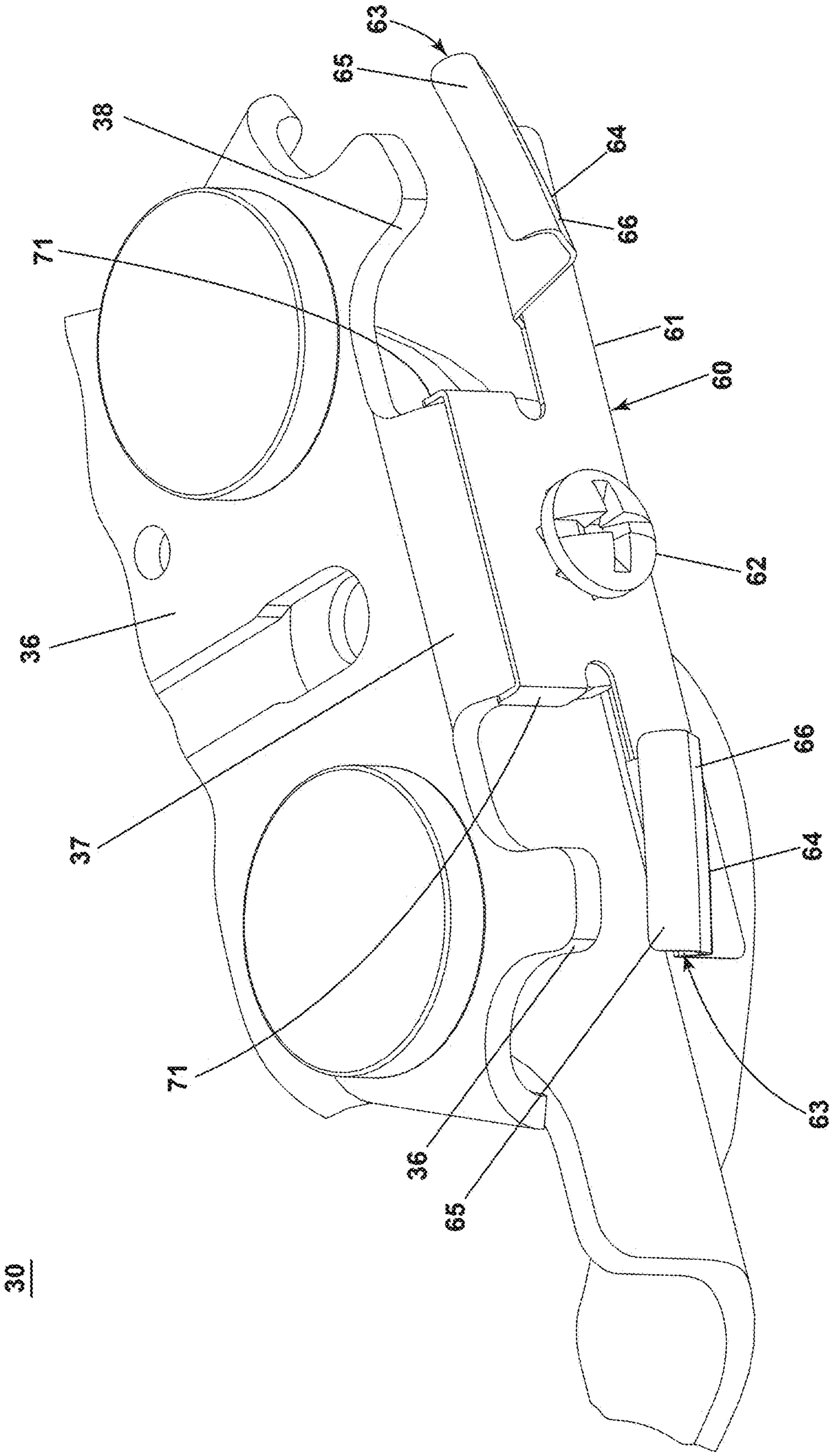
FIG. 6 is a perspective view of the area of FIG. 5.

FIGS. 5 and 6 illustrate the interface between the snap spring 60 and the flange 37. The base 61 includes tabs 71 that wrap around at least a portion of the edge of the flange 37. The tabs 71 retard clockwise rotation of the base 61 about and axis looking down the centerline of the fastener 62. The tabs 71, along with the base 61, retard rotation about a vertical axis passing through the centerline of the fastener. The tabs 71 thereby help retard the base 61 from twisting, especially when the fastener 62 is installed, which helps maintain the level of the locating feet 63 such they will more easily be received with the pocket 55.

The snap spring 60 is shaped such that the unflexed outer diameter defined by the reverse turn 66 is slightly larger than the diameter of the recess 56, which leads to the locating feet 63 being sprung and flexed when received within the recess 56, which aids in holding the canopy 50 to the surface bracket 30, since the locating feet 63 are biased into the recess 56. When the canopy is secured to the surface bracket 30, the second segment 65 will bear against and support the upper shoulder 59 to help hold the canopy in the desired position. At the same time, the reverse turn 66 is biased into the recess 56 to further aid in holding the position of the canopy.

To remove the canopy 50 from the surface bracket 30, a downward force must be applied to the canopy 50, with the magnitude of the downward force being great enough to deflect the snap spring 60 and permit the removal of the canopy 50.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan assembly mountable to a surface, such as a ceiling, the ceiling fan assembly comprising:
- a ceiling fan;
- a surface bracket mountable to the surface and defining an outer periphery and having at least one snap spring with spaced locating feet, which project laterally from the outer periphery;
- a downrod coupling the ceiling fan and the surface bracket; and
- a canopy having an opening through which the downrod passes and a set of pockets receiving the locating feet.

2. The ceiling fan assembly according to claim 1 wherein the at least one snap spring is a metal plate.

3. The ceiling fan assembly according to claim 2 wherein the spaced locating feet are bent portions of the metal plate.

4. The ceiling fan assembly according to claim 3 wherein the metal plate further comprises a base attached to the outer periphery and the locating feet extend from the base.

5. The ceiling fan assembly according to claim 4 wherein the locating feet have a reverse turn.

6. The ceiling fan assembly according to claim 1 wherein the surface bracket comprises a ball seat and the downrod comprises a ball seated within the ball seat.

7. The ceiling fan assembly according to claim 6 wherein the surface bracket comprises a wing with a peripheral flange, which at least partially defines the outer periphery, and the at least one snap spring is mounted to the peripheral flange.

8. The ceiling fan assembly according to claim 7 wherein the at least one snap spring is mechanically secured to the peripheral flange.

9. The ceiling fan assembly according to claim 1 wherein the at least one snap spring comprises a set of snap springs equally spaced about the surface bracket.

10. The ceiling fan assembly according to claim 9 wherein the set of snap springs comprise at least two snap springs that are diametrically opposed on the surface bracket.

11. The ceiling fan assembly according to claim 1 wherein the canopy comprises a peripheral channel defining the set of pockets.

12. The ceiling fan assembly according to claim 11 wherein the peripheral channel is continuous.

13. The ceiling fan assembly according to claim 1 wherein a diameter of the canopy below the pockets is greater than the diameter of the canopy above the pockets.

14. The ceiling fan assembly according to claim 1 wherein the locating feet define a first cross section and the pockets define a second cross section, which is complementary to the first cross section.

15. The ceiling fan assembly according to claim 14 wherein the first cross section is concave and the second cross section is convex.

16. The ceiling fan assembly according to claim 14 wherein the locating feet comprise a first segment and a second segment which join at a junction.

17. The ceiling fan assembly according to claim 16 wherein the pockets define a shoulder and the junction bears against the shoulder.

18. The ceiling fan assembly according to claim 16 wherein the first segment extends away from the surface bracket and the second segment extends toward the surface bracket.

19. The ceiling fan assembly according to claim 18 wherein the junction defines a reverse turn.

20. The ceiling fan assembly according to claim 19 wherein the first segment is longer than the second segment.

* * * * *